4448

REISSUED JUN 27 1871

Witnesses.
W. L. Kennedy
Seaman

Inventor
M. G. Wilder
by his atty
E. S. Renwick

AM. PHOTO-LITHOGRAPHIC CO. N.Y. (OSBORNE'S PROCESS.)

UNITED STATES PATENT OFFICE.

MOSES G. WILDER, OF WEST MERIDEN, CONNECTICUT.

IMPROVEMENT IN PUNCHING-PRESSES.

Specification forming part of Letters Patent No. 65,143, dated May 28, 1867; reissue No. 4,448, dated June 27, 1871.

*To all whom it may concern:*

Be it known that I, MOSES G. WILDER, of West Meriden, county of New Haven and State of Connecticut, have made an invention of certain new and useful Improvements in Presses for Working Metals and for other purposes; and that the following is a full, clear, and exact description and specification of the same.

The principal object of the invention is to enable the punch or moving die to be rapidly and conveniently adjusted to the exact position required relatively to the stationary die; and this is effected, according to my invention, by the interposition, between the punch-holder and that part of the press which receives motion from the source of power by which the press is worked, of an eccentric controlled by a worm-wheel and a tangent-screw. In the combinations of which these instrumentalities form part the turning of the eccentric varies the position attained by the punch-holder, and the tangent-screw and worm-wheel are the means of effecting the turning of the eccentric, and of holding it securely in whatever position it may set.

There are many modes in which the invention may be carried into effect, according to the construction of the press to which it is applied and to the views of constructors as to what part of the press the interposition of the adjusting mechanism should be made, the general rule being that the adjusting mechanism is to be applied to one of the joint-pivots or journals of the power-transmitting mechanism that intervenes between the punch-holder on one side and the part of the press mechanism to which power is applied on the other side.

In order that the invention may be fully understood, I have represented in the accompanying drawing, and will proceed to describe, a foot-press embodying the invention in the first form in which it was applied by me.

Figure 1:
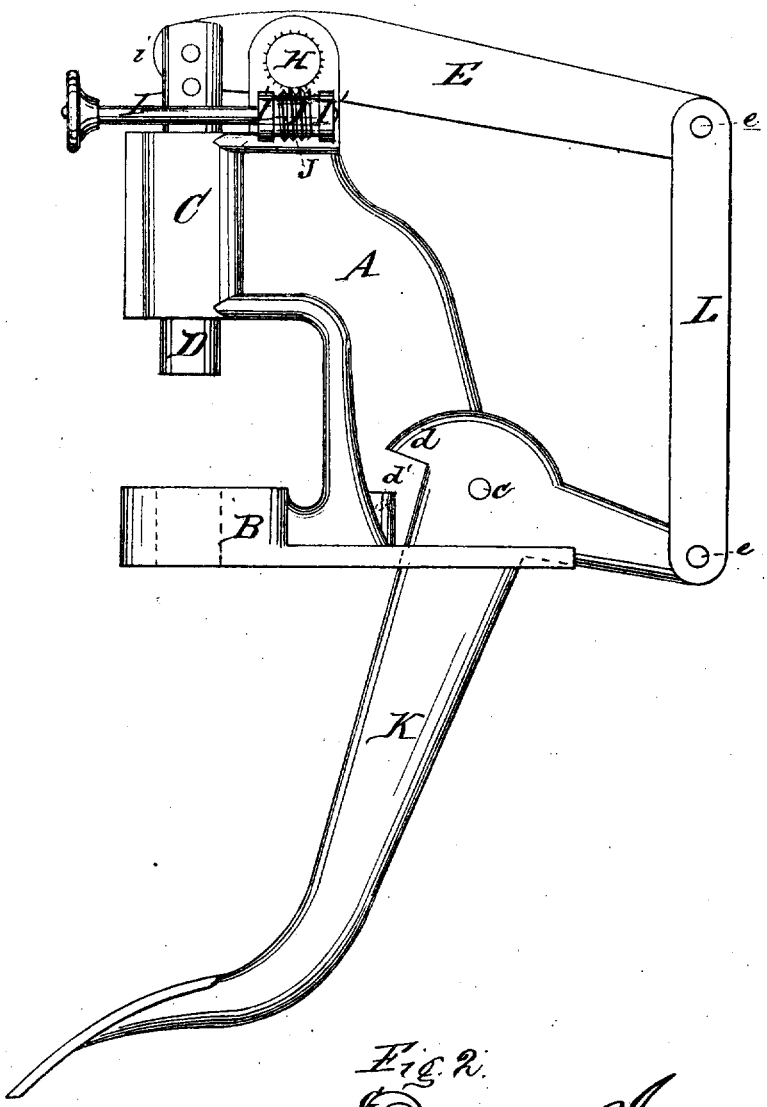
Figure 2:
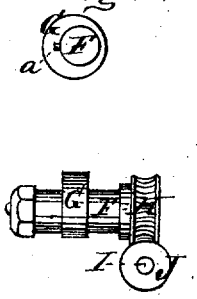

In said drawing, Figure 1 represents a side elevation of said press, and Figs. 2 and 3 represent views of parts of the press detached from the residue.

The press, thus represented, has a stock, A, within a bed, B, to which the fixed die is secured. Above the bed is the punch-holder D, which carries the punch or movable die, and is constructed to move toward and from the fixed die in a tubular guide, C, forming part of the stock. The power in this press is applied through a treadle-lever, K, which is pivoted to the stock A and has a limited range of motion, the stock being constructed with a boss, $d'$, against which a spur, $d$, secured to the treadle, strikes when the treadle-lever has moved the required distance, so that the further movement of the lever in that direction is stopped. The treadle-lever K is connected with the punch-holder D through the intervention of power-transmitting mechanism, composed, in this case, of the lever E, the connecting-rod L, and the pivots or pins *e e i* F, which connect the lever and the connecting-rod with each other, with the press-stock, with the die-carrier, and with the treadle-lever, the said pins having journals upon which the parts move. In a press thus constructed I prefer to apply the eccentric to the pin F, which connects the lever E with the press stock, and to this end the eccentric G is secured to said pin by means of a key, *a*, Fig. 2. So long as this eccentric is held fast in any position the punch-holder will always be depressed to the same point by the movement of the treadle-lever; but if the eccentric be turned, the point to which the punch-holder will be depressed will be varied. The turning of the eccentric, therefore, effects the adjustment of the punch-holder; and in order that the eccentric may be turned and held as required for the adjustment and operation of the punch-holder the eccentric pin F is fitted with a worm-wheel, H, and a tangent-screw, J, is provided to turn said worm-wheel, and the eccentric with which it is connected, through the pin F. The journals of the tangent-screw turn in brackets I′, and one of the journals is extended to form a handle, I, by means of which the tangent-screw can be readily turned.

Now, after the dies have been properly arranged and it is desirable to adjust the action of the movable die or punch relatively to the lower die, it is only necessary first to place the foot upon the treadle and with one hand turn the handle I until the action of the eccentric upon the lever shall elevate or depress the movable die or punch to produce the desired relative position to the stationary die, thus saving a great amount of time and irksome labor, and rendering the machine more desirable and convenient for use.

I believe I have thus shown the nature, construction, and advantage of this improvement, so as to enable others skilled to make and use the same therefrom, and it must be evident to the skilled mechanician that, as the eccentric with its worm-wheel and tangent-screw are combined with the punch-holder and transmitting mechanism, the positionof the eccentric in the transmitting mechanismcan be varied without varying its operation—thus, for example, the said eccentric might be applied to any one of the other pins or pivots *i e e*, the worm-wheel and tangent-screw being, of course, applied to operate the eccentric in its new position, and the turning of the eccentric will have the same operation in adjusting the position to which the punch-holder is depressed as it has when applied to the pin F; moreover, the worm-wheel and tangent-screw will operate in the new position of the eccentric, as in the one first described, to move and to hold the eccentric as required. It must also be obvious that the form of the transmitting mechanism of the press can be greatly varied, without ceasing to embody the invention, so long as there be between the punch-holder and the part of the press to which the power is applied a joint-pin or journal to which the eccentric can be applied, in connection with the worm-wheel and tangent-screw for operating it.

What I claim as my invention, and desire to secure by Letters Patent, is—

1. The combination of the punch-holder of the press with the eccentric, the worm-wheel, and the tangent-screw, substantially as before set forth.

2. The combination of the eccentric, the worm-wheel, and the tangent-screw with the transmitting mechanism and punch-holder of the press, substantially as above set forth.

3. The combination of the eccentric and its pin, the worm-wheel, and the tangent-screw with the stock of the press, substantially as before set forth.

Witness my hand this 8th day of December, A. D. 1870.

MOSES G. WILDER.

Witnesses:
J. S. GARLAND,
A. E. HICKS.